United States Patent [19]

Weaver et al.

[11] 4,019,913

[45] Apr. 26, 1977

[54] PROCESS FOR FABRICATING SILICON CARBIDE ARTICLES

[75] Inventors: Gerald Q. Weaver, Princeton; Bradford A. Olson, Leicester, both of Mass.

[73] Assignee: Norton Company, Worcester, Mass.

[22] Filed: July 18, 1975

[21] Appl. No.: 597,171

[52] U.S. Cl. .............................. 106/44; 106/73.5; 423/346

[51] Int. Cl.² ...................................... C04B 35/56

[58] Field of Search ................... 106/43, 44, 73.5; 423/345, 346

[56] References Cited

UNITED STATES PATENTS

| 3,189,472 | 6/1965 | Taylor | 106/44 |
|---|---|---|---|
| 3,459,566 | 8/1969 | Wilson et al. | 106/44 |
| 3,882,210 | 5/1975 | Crossley et al. | 423/345 |

*Primary Examiner*—J. Poer
*Attorney, Agent, or Firm*—Arthur A. Loiselle, Jr.

[57] ABSTRACT

Silicon carbide articles are formed by wet milling a mixture of silicon carbide having an average particle size less than 10 microns, and colloidal graphite; eliminating powder agglomerates larger than 325 mesh (U.S. Standard Sieve Series); drying the milled powder and pressing it to the desired shape; and finally, firing the preform at approximately 2000° C. in the presence of silicon, converting the graphite to silicon carbide.

5 Claims, No Drawings

PROCESS FOR FABRICATING SILICON CARBIDE ARTICLES

BACKGROUND OF THE INVENTION

This invention relates to sintered silicon carbide bodies. More particularly, the invention relates to a process for forming silicon carbide articles.

Silicon carbide articles or bodies of simple geometry have been formed by the hot-pressing method. One such method is described by R. A. Alliegro et al., Journal of the American Ceramics Society, 39, page 386 (1965) and by Weaver et al in U.S. Pat. No. 3,836,673. According to Weaver highly dense silicon carbide bodies are formed by intimately mixing fine alpha silicon carbide powder and 0.5 to 5% by weight of fine aluminum powder, by ball milling the two materials in isopropanol, drying the mixture and passing it through a 40 mesh screen (U.S. Standard Sieve Series), loading the thusly prepared powder mixture into a graphite mold set-up, and hot-pressing the powder in an induction heated furnace using argon gas as a purge at a temperature of 2075° C. at approximately 2700 p.s.i. The resulting product has a density essentially that of theoretical. Although silicon carbide does not readily lend itself to the straight forward conventional cold pressing and sintering process, because of the reluctance of the silicon carbide particles to sinter and densify, silicon carbide articles have been successfully made by modifications of this basic process. It has been found that the incorporation of minor amounts of certain metals e.g. boron or aluminum, facilitates the formation of relatively dense silicon carbide bodies by cold pressing a green shape followed by sintering.

Another fabrication technique is the so-called reaction sintering or reaction bonding method. According to this method a green body or perform of silicon carbide powder or silicon carbide and a carbonaceous material or carbon per se, is made by cold-pressing, extruding, isostatic pressing, casting, or the like. The green body is then heated in contact with molten silicon metal or silicon vapors which causes the silicon to enter the interstices of the preform. When carbon is present in the preform the silicon reacts with the carbon to form additional silicon carbide thus densifying the structure. C. W. Forrest et al., in Special Ceramics, 5, page 99 (1972) describes extensive work done with the reaction sintering technique. One of the variables studied by these workers was the effect of the particle size of the starting silicon carbide powder. Their data showed that particle size had a very pronounced effect on mechanical strength down to a particle size of about 100 microns. However below that particle size the effect on the mechanical properties was much less pronounced.

Several variants of the basic reaction sintering process have been described in the patent literature. According to J. C. Andersen in U.S. Pat. No. 2,938,807 dense silicon carbide bodies are formed, containing less than 5% free silicon, by cold pressing a uniform mixture of silicon carbide powder, a carbonaceous material e.g. graphite, and a carbonizable material which functions as a temporary binder as well as a donor to the total amount of carbon. The green shape is heated to carbonize the carbonizable material followed by a subsequent heat treatment at 2250° C. in the presence of silicon metal, which results in the situ formation of silicon carbide in the pores of the original cold pressed shape. The particle size of the silicon carbide employed by Andersen was relatively coarse. The fine grit mixture which Andersen employed was made up, in terms of parts by weight, of 49.5 parts of 100 mesh (170 microns) silicon carbide, 13.1 parts of 220 mesh (70 microns), 12.3 parts of 20 micron material and 8.2 parts of 6–7 micron material; the numerical average particle size of this fine mixture is relatively coarse. A modified reaction sintering method is disclosed by K. M. Taylor in U.S. Pat. No. 3,205,043 wherein a green silicon carbide preform is cold pressed from silicon carbide powder containing a small quantity of a temporary organic binder, for example a phenolic resin. The preformed body is fired at 2300° C. by way of a gradual temperature rise from room temperature, which causes the decomposition and removal of the temporary binder and the recrystallization of the silicon carbide. The resulting porous structure is then impregnated with a carbonizable material such as a furfural based compound or a phenol-aldehyde resin, and subsequently heat treated to carbonize the organic material. The impregnation with the organic material and the subsequent carbonizing heat treatment are repeated until the carbon content of the sintered silicon carbide preform is 85 to 95% of what is needed to react with the theoretical amount of silicon needed to fill essentially all of the pores. The carbon laden silicon carbide structure is then contacted with silicon metal at about 2200° C. The silicon melts and penetrates the structure, reacting with the carbon to form silicon carbide. Like Andersen, Taylor's silicon carbide powder is multi-modal and relatively very coarse. The finest silicon carbide mixture exemplified by Taylor has the following make-up on a parts by weight basis: 55 parts 100 mesh (170 microns), 15 parts of 220 mesh (70 microns) 15 parts of 3F mesh, and 15 parts of 100 mesh.

According to P. Popper in U.S. Pat. No. 3,275,722 dense self-bonded bodies of silicon carbide result from preforming a mixture of silicon carbide powder, carbon for example in the form of colloidal graphite, and a temporary binder. Although Popper teaches exposing the preform to silicon within the temperature range of from 1800° to 2300° C., his preferred teaching is the heat treatment in vacuum of the preformed material in contact with silicon at only 1500° C. The particle size of the silicon carbide employed by Popper is relatively very coarse with a typical mix, including graphite, having the following weight percent makeup: 43% 80 mesh (240 microns), 11% 220 mesh (70 microns) and 18% 700 mesh (less than 16 microns) silicon carbide admixed with 28% graphite.

Still a further variant is C. W. Forrest process described in U.S. Pat. No. 3,495,939. Forrest forms a porous, coherent body of powdered silicon carbide and carbon which can originate from colloidal graphite, heats the preformed shape at from 1600° to 1700° C. in an environment of silicon monoxide vapor which increases the surface porosity of the body, and while heating, contacts at least one surface of the body with molten silicon metal. Capillarity draws the molten silicon into the pores of the body forming silicon carbide therein.

A further advancement in the art is set out in G. Q. Weaver's pending application Ser. No. 555,855, filed Mar. 6, 1975. The application discloses a process particularly directed at the fabrication of complex silicon carbide shapes. A green set of billets is formed by any of the several well known techniques including hot-pressing. If the billet is cold formed it is then lightly sintered at a temperature of 1500° to 2000° C. Alternatively the light sintering may be accomplished by directly hot-pressing the silicon carbide powder. In addition to sintering this treatment causes partial densification. A billet or slab is then shaped to the desired configuration by machining, scraping, grinding or the like. The shaped body is then fully sintered and densified by a second heat treatment at a temperature of about 2000° C. which further and finally densifies the structure. Alternatively the foregoing procedure may include and preferably does include, the inclusion in the original silicon carbide powders of 5 to 40% by weight of carbon or the carbon may be added after the initial sintering step in the form of a carbonizable material as disclosed in the Taylor Patent U.S. Pat. No. 3,205,043. In this latter case the carbon-containing presintered silicon carbide body is then exposed to silicon metal at a temperature of 1500° to 2100° C. in a nitrogen atmosphere, which causes the silicon to permeate the silicon carbide structure and react with the carbon therein to form silicon carbide in situ and resulting in full and final densification of the shaped article. The particles size of the original silicon carbide powder is preferably approximately 3 microns. The silicon carbide however may be bimodal in makeup in which case at least 50% of the silicon carbide powder has an average particle size of 3 microns or less while the remainder of the silicon carbide may be from 30 to 170 microns.

SUMMARY OF THE INVENTION

The process is an improved method for fabricating reaction-bonded silicon carbide shapes having a cross-bending strength (3 point loading) of at least 67,000 p.s.i. The process requires the utilization of finely powdered silicon carbide i.e. silicon carbide powder with an average particle size of less than 10 microns. When powdered carbon is used, it too must have a particle size under 10 microns; colloidal graphite is ideal for the carbon source, because it is very fine in particle size and may be obtained already suspended in a liquid medium for ready mixing with the silicon carbide powder with the addition of more liquid.

If the silicon carbide-carbon mixture is to be formed by slip-casting or extrusion then the two materials are blended by milling in an aqueous medium. On the other hand if the forming method is pressing, then the mixture after blending must be in a relatively dry condition. This requires a second milling step in a nonaqueous liquid such as isopropanol. When the aqueous mixture is dried, it results in a badly agglomerated mixture. When this dried mixture is milled in isopropanol, and whatever agglomerates coarser than 60 mesh are removed, the resulting material is a fine, fluffy powder ideally suited for pressing. In addition to coarse agglomerates of mix, said mix usually contains foreign matter, such as particles of the milling media used or even coarse particle contamination in the original silicon carbide powder. It is critical that these coarse particles be removed. If they are present in the finished product, the coarse particles function as a flow or defect in the structure and therefore a point of physical weakness.

If the shape to be made is relatively simple so that it may be formed directly by pressing, then the twice milled and dried silicon carbide-carbon molding powder is pressed to shape and either exposed to silicon metal vapors or contacted with molten silicon at a temperature in excess of 2000° C. This heat treatment causes densification of the original silicon carbide and the in situ formation of new silicon carbide. By contrast, if the refractory article is of a complex geometry, that the silicon carbide-carbon molding powder is first cold molded into a simple billet and the billet is fired at around 1900° C. in an inert atmosphere to lightly sinter the silicon carbide. The lightly sintered billet is then machined to the proper shape and dimensions and siliconized to fully sinter and densify the body. Siliconization is carried out by firing the body of about 2000° C. in a nitrogen atmosphere either laden with silicon vapors, or with the shaped body in contact with molten silicon. The final firing is done at a temperature in excess of 1900° C. and preferably in excess of 2000° C.

DESCRIPTION OF THE PREFERRED EMBODIMENTS

In its preferred mode, silicon carbide powder having an average particle size of about 3 to 4.5 microns is blended with water and a sufficient amount of colloidal graphite (e.g. DAG 37 manufactured by Acheson Colloids Company) to give a composition of 82% silicon carbide and 18% graphite by weight. The slurry is mixed in a rod mill for several hours, drained and dried. At this point the mixture is in the form of a hard, coherent cake. The cake is broken up and milled with isopropanol. The isopropanol slurry is then screened to remove any still existing agglomerates which are larger than 120 mesh and preferably anything larger than 325 mesh. The slurry is freed of isopropanol, leaving a fine fluffy powder.

The thusly prepared molding powder is placed in a mold and pressed. The preform is then directly siliconized at a temperature in excess of 2000° C. in a nitrogen atmosphere in the presence of silicon. If the article being formed is so complex that it cannot easily be formed directly by pressing, then a billet is pressed, partially sintered at a temperature in excess of 1900° C. in an inert atmosphere, the billet machined to the desired shape and size, and finally siliconized at a temperature in excess of 2000° C. in nitrogen. A fully sintered and densified material results when the silicon reacts with graphite in the interstices formed by the fine, silicon carbide particles. The remaining pores are filled with metallic silicon.

The following are examples of the preferred mode of practicing the invention, as known to the applicants at the present time.

EXAMPLE I

A casting slip was prepared by mixing 100 grams of silicon carbide powder having an average particle size of approximately 4.5 microns, with 100 grams of DAG-37 a water-graphite colloid which contained 22% by weight of solids. The slip was cast in the conventional manner to form a green crucible 1 inch high, 1 inch in diameter and having a ⅛ inch thick wall. The green crucible was fired in an $N_2$ atmosphere laden with silicon vapors at 2070° C. The silicon permeated the green structure, reacting with the graphite therein to form silicon carbide. A fully sintered and dense product resulted which had a density of 3.06 g/cc.

EXAMPLE II 10 kilograms of 3 micron silicon carbide powder and 10 kilograms of the above described graphite colloid were milled for 24 hours in a Sweco vibratory mill filled with a rod shaped silicon carbide milling medium. The milled mixture was dried. The caked mixture was broken into small chunks, placed in polyurethane lined ball mill containing silicon carbide milling media, to which was added 12 liters of isopropanol. Following 48 hours of milling the slurry was screened through a 325 mesh screen and freed of the alcohol by heating at 80° C. The dried cake was then passed through a Hobart colander equipped with an 18 mesh screen. The result was a fine fluffy molding compound. A 602 gram quantity of the molding compound was placed in a conventional steel mold set-up, with an 8 inch diameter cavity. The material was pressed under 2.5 tons per square inch at ambient temperature, forming an 8 × ⅜ inch disc. The cold pressed disc was placed in an induction furnace in contact with silicon metal, and the disc was heated at 2070° C. in nitrogen. The silicon wetted, infiltrated the silicon carbide matrix, and reacted with the graphite therein to form silicon carbide. The resulting material had a density of 3.00 g/cc and a cross-bending strength at room temperature of 79,000 p.s.i.

EXAMPLE III

A cylinder with a 7 inch O.D. and 5 inch I.D. with a chamfer on both edges was formed by milling 10 kilograms of 3 micron silicon carbide powder with 2405 grams of the aforedescribed graphite colloid DAG 37, and 7595 mls. of distilled water in a Sweco vibratory mill filled with a rod shaped silicon carbide milling medium, for 24 hours. The water was then removed and the material dried by subjecting it to 80° C. for 48 hours. The resultant cake was broken up and milled with 12 liters of isopropanol for 48 hours and screened through a 325 mesh screen, removing agglomerates larger than 325 mesh. The screened fraction was then rendered free of the alcohol by heating at 80° C. for 24 hours. The cake was then passed through a Hobart colander fitted with an 18 mesh screen. 3000 grams of the powder was mixed with 300 grams of a 1% methylcellulose solution in a Hobart mixer for 20 minutes. This was screened through the Hobart colander with the 18 mesh screen. A conventional isostatic pressing mold set-up with an I.D. of 8 inches and a 5 inch diameter arbor was assembled and 2500 grams of the silicon carbide-graphite molding powder placed therein and pressed at room temperature and 20,000 p.s.i. The pressed cylinder measuring 6 inches high, with a 7 inch O.D. and a 5 inch I.D. was then sintered in an argon atmosphere at 1970° C. The partially sintered cylinder was cut to a length of 4 inches and a chamfer ground on both edges of the cylinder. The shaped article was then fired in an induction furnace at 2070° C., in the presence of silicon metal and in a nitrogen atmosphere. The silicon metal vaporized and permeated the structure of the shaped article reacting with the carbon (graphite) and completing the sintering of the silicon carbide matrix.

EXAMPLE IV 230 grams of the graphite containing 3 microns silicon carbide molding powder prepared in Example 3 was placed in a steel mold set-up having a mold cavity measuring 6 inches × 6 inches. The mold set-up was assembled and the powder pressed at 2.5 tons/in.$^2$ resulting in a plate 0.2 inch in thickness. The plate was stripped from the mold and had a bulk density of 1.96 g/cc. Subsequently the plate was fired at 1970° C for 15 minutes in an induction heated graphite furnace with an argon purge at a rate of 4 liters/minute. After cooling the piece was removed from the furnace and placed in an induction furnace in contact with silicon metal in an amount approximating the bulk weight of the preformed plate. The plate and the silicon metal were muffled in graphite. The furnace was brought up to 2070° C. and held at that temperature for 15 minutes while the furnace was being purged with nitrogen at 5 liters/minute. The furnace was allowed to cool to room temperature and the plate was removed. The final density was 3.00 g/cc and the flexural strength at room temperature of test specimens cut from the plate ranged from 67,000 to 70,000 p.s.i.

EXAMPLE V 200 grams of silicon carbide powder having an average particle size of approximately 3 microns was blended with 60 grams of colloidal graphite DAG 37, and 100 cc. of distilled water were placed in a rubber lined jar mill containing aluminum oxide grinding media. The jar was rolled for 24 hours after which the material was removed and dried at 80° C. The resultant cake was broken up in a rubber lined mill again using alumina milling media and 300 cc. of isopropanol. The material was milled for 24 hours after which the contents of the jar were removed and passed through a 325 mesh screen. After screening the mixture was dried at 80° C. for 24 hours. The dried powder was then passed through a Hobart colander fitted with an 18 mesh screen producing a fluffy powder ideally suited for pressing. A 4 × 4 × 0.4 inch piece was pressed in a conventional steel mold at 2.5 tons/in.$^2$ resulting in a bulk density of approximately 198 g/cc. The cold formed plate was loaded into an induction heated furnace, surrounded by an equivalent weight or silicon metal, and a graphite muffle. The furnace was fired to 2070° C. with a 15 minute soak at that temperature using nitrogen as a purge. After cooling to room temperature the piece was removed. Its final density was 3.02 g/cc and cross-bending test specimens cut therefrom had flexural strength at room temperature of from 77,000 to 80,000 p.s.i.

EXAMPLE VI

An extrusion mix was made up using the molding powder prepared in Example 3 by taking 400 grams of this powder and blending into it 60 grams of methylcellulose (10% solution). The mixture was blended for 30 minutes in a Hobart mixer after which it was placed in a Watson Stilman extruder, deaired, and extruded at 5 tons through a ⅜ inch diameter die. Uniform rods were made having a bulk density of 1.80 g/cc. Some of the rods were prefired to 1970° C. in argon. The prefired rods and rods that had not been prefired were siliconized as described above at 2070° C. in nitrogen. The rods produced by both methods had a final density of approximately 3.00 grams/cc and a cross-bending strength of 70,000 p.s.i.

What is claimed is:

1. A process for manufacturing a silicon carbide body which comprises the steps of preparing a fluid mixture of a liquid, fine silicon carbide powder having an average particle size less than 10 microns and colloidal graphite, said graphite being present in an amount of from 5 to 40% by weight of the total weight of graphite and silicon carbide, thoroughly mixing said silicon carbide and graphite, eliminating agglomerates of the powder having a size greater than 325 mesh, drying the powder, forming the dry powder to shape and thereafter firing the shaped body at a temperature in excess of 2000° C. in the presence of silicon to convert the colloidal graphite to silicon carbide.

2. The process of claim 1 wherein the mixture of silicon carbide and graphite is first milled in water and then in an organic medium.

3. The process of claim 1 wherein the pressed powder is fired to a temperature above 1900° C. imn an inert atmosphere to partially sinter the fine silicon carbide powder in the starting mixture.

4. The process of claim 3 including the step of further shaping of said partially sintered body prior to the final firing in the presence of silicon.

5. The process of claim 1 wherein said forming of said dry powder is accomplished by slip casting.

* * * * *